United States Patent
Wypart et al.

[11] Patent Number: 5,717,028
[45] Date of Patent: Feb. 10, 1998

[54] THERMOPLASTIC ELASTOMER COMPOSITION CONTAINING CHLORINATED POLYOLEFIN GRAFT COPOLYMER

[75] Inventors: Roman W. Wypart; Roger W. Avakian, both of Parkersburg, W. Va.; Keith D. Treadway, Marietta, Ohio

[73] Assignee: General Electric Company, Pittsfield, Mass.

[21] Appl. No.: 902,861

[22] Filed: Jul. 30, 1997

Related U.S. Application Data

[63] Continuation of Ser. No. 530,547, Sep. 19, 1995, abandoned.

[51] Int. Cl.$^6$ ........................................ C08L 51/04
[52] U.S. Cl. ........................ 525/76; 525/71; 525/86
[58] Field of Search ........................ 525/76, 86, 71

[56] References Cited

U.S. PATENT DOCUMENTS

| | | | |
|---|---|---|---|
| 3,494,982 | 2/1970 | Grabowski et al. | 524/411 |
| 3,509,237 | 4/1970 | Aubrey | 525/71 |
| 3,515,774 | 6/1970 | Lee | 525/243 |
| 3,658,950 | 4/1972 | Ello Eusebl | 525/238 |
| 3,773,552 | 11/1973 | Bird et al. | 428/516 |
| 3,819,763 | 6/1974 | Akane et al. | 525/75 |
| 3,883,615 | 5/1975 | Kudo et al. | 525/77 |
| 3,914,339 | 10/1975 | Shima et al. | 525/261 |
| 3,953,540 | 4/1976 | Takezoe et al. | 524/409 |
| 4,096,206 | 6/1978 | Boyer | 524/100 |
| 4,144,287 | 3/1979 | Kudo et al. | 525/71 |
| 4,150,066 | 4/1979 | Kudo et al. | 524/341 |
| 4,341,884 | 7/1982 | Schepers | 525/211 |
| 4,341,885 | 7/1982 | Schepers | 525/211 |
| 4,424,309 | 1/1984 | Schepers | 525/211 |
| 4,468,487 | 8/1984 | Schepers et al. | 524/87 |
| 4,743,642 | 5/1988 | Yanacek et al. | 524/358 |
| 4,767,817 | 8/1988 | Lee | 524/494 |
| 4,773,957 | 9/1988 | Briggs | 525/76 |
| 4,794,143 | 12/1988 | Ho | 525/196 |
| 4,877,827 | 10/1989 | Van Der Groep | 524/477 |
| 4,885,342 | 12/1989 | Bakker | 525/230 |
| 4,997,880 | 3/1991 | Van Der Groep | 525/57 |
| 5,306,548 | 4/1994 | Zabrocki et al. | 428/215 |
| 5,334,450 | 8/1994 | Zabrocki et al. | 428/332 |

FOREIGN PATENT DOCUMENTS

WO 93/17076  9/1993  WIPO.

*Primary Examiner*—Mark L. Warzel

[57] ABSTRACT

A thermoplastic elastomeric composition is provided exhibiting reduced levels of hardness and enhanced levels of elongation. The composition contains a chlorinated polyolefin and graft copolymer having a rubber substrate present at a level of 65 to 90 percent by weight based on the total weight of the graft copolymer. Preferably the graft copolymer is an acrylonitrile-butadiene-styrene graft copolymer and preferably the chlorinated polyolefin is a chlorinated polyethylene having a high molecular weight and a relatively low chlorine level. The composition is useful for making molded articles such as interior automotive components requiring high elongation and tear resistance, reduced hardness and often high strain recovery.

13 Claims, No Drawings

THERMOPLASTIC ELASTOMER COMPOSITION CONTAINING CHLORINATED POLYOLEFIN GRAFT COPOLYMER

This is a continuation of application Ser. No. 08/530,547 filed on Sep. 19, 1995 now abandoned.

BACKGROUND OF THE INVENTION

1. Field of the Invention

The present invention relates to thermoplastic elastomer compositions, and more particularly relates to thermoplastic elastomers containing a chlorinated polyolefin and a graft copolymer.

2. Description of the Related Art

Graft copolymer/chlorinated polyethylene blends are generally known, see Grabowski et al., U.S. Pat. No. 3,494,982 issued Feb. 10, 1970, which is incorporated herein by reference. Such blends, however, have typically higher than desired levels of hardness and/or have had lower than desired levels of elongation. There is generally a need (such as for automotive interior parts) for thermoplastic elastomer compositions which exhibit the combined levels of low hardness, high elongation, high strain recovery and tear resistance.

Consequently, there is a need for graft copolymer/chlorinated polyolefin blends exhibiting low hardness, high elongation, high strain recovery, and tear resistance.

SUMMARY OF THE INVENTION

The present invention involves thermoplastic elastomer compositions comprising (a) a chlorinated polyolefin and (b) a graft copolymer comprising a rigid superstrate and a rubber substrate where in the rubber substrate is present at a level of from 65 to 90 percent by weight based on the total weight of the graft copolymer. Preferably the chlorinated polyolefin is a high molecular weight chlorinated polyolefin and preferably has a medium chlorine content, and preferably the graft copolymer has a vinyl aromatic-vinyl cyanide superstrate and a diene rubber substrate wherein the diene rubber substrate has a relatively large number average diameter particle size. The compositions exhibit relatively low levels of hardness and relatively higher levels of elongation.

DETAILED DESCRIPTION OF THE INVENTION

A thermoplastic elastomer composition is provided comprising (a) a chlorinated polyolefin and (b) a graft copolymer comprising (i) a rigid polymeric superstrate and (ii) a rubber substrate wherein the rubber substrate is a present at a level of from 65 to 90 percent by weight based on the total weight of the graft copolymer. Preferably, the chlorinated polyolefin is present at a level of 15 to 95 percent by weight based on the total weight of the composition, more preferably from 30 to 85 percent by weight thereof, and most preferably from 40 to 85 percent by weight thereof. Preferably the graft copolymer is present at a level of from 5 to 85 percent by weight based on the total weight of the composition, more preferably from 15 to 70 percent by weight thereof, and most preferably from 15 to 60 percent by weight thereof.

The chlorinated polyolefin contains chlorine at a level of from 20 to 55 percent by weight based on the total weight of the chlorinated polyolefin, more preferably from 25 to 45 percent by weight thereof, and more preferably from 33 to 40 percent by weight thereof. The chlorinated polyolefin preferably has a relatively low chlorine content to reduce the hardness of the final composition. The chlorinated polyolefin is preferably chlorinated polyolefin having a weight average molecular weight of between 30,000 and 1,500,000, more preferably between 50,000 and 500,000, and most preferably a relatively high molecular weight of between 100,000 and 300,000. The chlorinated polyolefin may be a chlorosulfonated polyolefin such as a chlorosulfonated polyethylene.

The graft copolymer is preferably a vinyl aromatic-vinyl cyanide-diene rubber graft copolymer comprising (i) a vinyl aromatic-vinyl cyanide and (ii) a diene rubber substrate.

Monovinylidene aromatic monomers (vinyl aromatic monomers) which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidene-aromatic monomers utilized are generically described by the following formula:

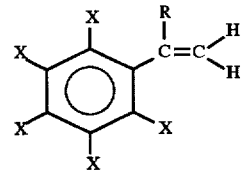

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth) acrylates or mixtures thereof. The acrylonitrile, substituted acrylonitrile, or acrylic acid esters are described generically by the following formula:

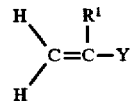

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer comprises (i) the rubber substrate, and (ii) a rigid polymeric superstrate portion grafted to the rubber substrate. The rubber substrate is preferably present in the graft copolymer at a level of from 65 to 90 percent by weight based on the total weight of the graft copolymer, and more preferably from 65 to 80 percent by weight thereof, and the rigid superstrate is preferably present at a level of from 10 to 35 percent by weight based on the total weight of the graft copolymer, and more preferably from 20 to 35 percent by weight thereof.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymers and diene rubbers may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methylmethacrylate or $C_1$-$C_8$-alkylacrylate which are produced by aqueous radical emulsion polymerization. The acrylate rubbers may be cross-linked, particulate emulsion copolymers substantially of $C_1$-$C_8$-alkylacrylate, in particular $C_2$-$C_6$-alkylacrylate, $C_1$ to $C_{18}$ alkyl methacrylates, optionally in mixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates or methacrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/shell structure, e.g. a core of diene rubber and a sheath of acrylate or vice versa.

Specific conjugated diene monomers normally utilized in preparing the rubber substrate of the graft polymer are generically described by the following formula:

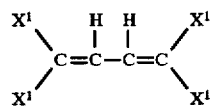

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of select one of the following: 0.05 to 1.2 microns, preferably 0.09 to 0.6 microns, for emulsion based polymerized rubber latices or 0.5 to 10 microns, preferably 0.6 to 1.5 microns, for mass polymerized rubber substrates which also have included grafted monomer occlusions. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and methylmethacrylate polymers or copolymers with up to 50% by weight of $C_1$-$C_6$ alkylacrylates, acrylonitrile or styrene or styrene and acrylonitrile. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

These rubber modified monovinylidene aromatic graft polymers are preferably polymerized by emulsion processes well known in the art. Furthermore, these graft copolymers may be produced either by continuous, semibatch or batch processes.

Preferably the graft copolymer has a large particle size rubber to reduce the hardness of the final composition. Preferably the rubber substrate has a number average particle size diameter of between 0.05 and 1.2 microns, more preferably 0.08 and 0.6 and most preferably between 0.20 and 0.45 microns (2000 to 4500 Å).

The present composition exhibits reduced levels of hardness and enhanced levels of elongation. Preferably the composition has a shore hardness (Shore D and A) of less than 40 ShD, more preferably less than 90 ShA, and most preferably less than 80 ShA; and preferably has a elongation percent of at least 200%, more preferably at least 300% and most preferably at least 400% as measured by ASTM norm D638-89 at crosshead speed 20 inches/min. Preferably the composition has a tensile strength (psi) as measured by ASTM norm D638-89 of at least 200 psi, more preferably at least 250 psi.

EXAMPLES

CPE/ABS blends were prepared according to formulations set out in table 1. The compounding ingredients were mixed in laboratory high intensity mixer. Then the blends were milled on two roll mill for 3 minutes at 340° F. roll mill temperature. The 0.125 inch thick 6×6 inches plaques were pressed at 340° F., to cut out the testing specimens.

The blends were prepared using commercial chlorinated polyethylenes. Tyrin 3615 (36% chlorine), Tyrin 3623A (36% chlorine) produced by the Dow Chemical Company. ABS resins having 50, 70, 80% of polybutadiene rubber, and two ABS resins having 65% butadiene-styrene rubber were also used. The blends were stabilized using Mark 3101 octyl tin mercaptide stabilizer, DLTDP—dilauryl thiodipropionate from Witco Corporation and Irganox 1076 antioxidant produced by Ciba-Geigy. Oxidized polyethylene AC 316A produced by Allied Corp. was used as an external lubricant.

ABS1 is styrene-acrylonitrile graft onto polybutadiene crosslinked rubber substrate average particle size 0.3 microns having about 704 of the rubber.

ABS2 is styrene-acrylonitrile partly crosslinked graft onto 85% butadiene-154 styrene copolymer substrate average particle size about 0.085 microns having 65% of the rubber.

ABS3 is styrene-acrylonitrile copolymer graft onto polybutadiene crosslinked substrate 0.3 micron average particle size having 80% of the rubber.

ABS4 is styrene-acrylonitrile copolymer graft onto polybutadiene crosslinked substrate 0.3 micron average particle size having 50% of the rubber.

ABS5 is styrene-acrylonitrile graft onto polybutadiene crosslinked rubber substrate 0.3 micron average particle size having 50% of the rubber. Compared to ABS4 styrene to acrylonitrile ratio is significantly higher.

ABS6 is α-methyl styrene-styrene-acrylonitrile copolymer graft onto polybutadiene crosslinked rubber substrate 0.3 micron average particle size having 14% of the rubber.

ABS7 is styrene-acrylonitrile copolymer graft onto polybutadiene rubber substrate 0.3 micron average particle size having 29% of the rubber.

TABLE 1

| Ingredients/Blend# | A | 1 | 2 | 3 | 4 | 5 | 6 | 7 | 8 |
|---|---|---|---|---|---|---|---|---|---|
| CPE1 | 100 | 75 | 50 | 40 | 30 | 20 | 75 | 50 | 50 |
| CPE2 | | | | | | | | | |
| ABS1 | | 25 | 50 | 60 | 70 | 80 | | | |
| ABS2 | | | | | | | 25 | 50 | |
| ABS3 | | | | | | | | | 50 |
| ABS4 | | | | | | | | | |
| ABS5 | | | | | | | | | |
| ABS6 | | | | | | | | | |
| ABS7 | | | | | | | | | |
| Tensile (PSI) | | | | | | | | | |
| Strength @ Yield | 166 | 235 | 332 | 387 | 487 | 606 | 266 | 481 | 262 |
| Modulus @ 10% strain | 45 | 112 | 256 | 352 | 471 | 630 | 160 | 494 | 121 |
| Modulus @ 50% strain | 139 | 256 | 450 | 583 | 694 | 839 | 312 | 642 | 282 |
| Modulus @ 100% strain | 164 | 302 | 536 | 701 | 816 | 972 | 346 | 707 | 356 |
| Modulus @ 200% strain | 181 | 379 | 680 | 898 | 1033 | 1237 | 411 | 851 | 469 |
| Modulus @ 300% strain | 211 | 473 | 840 | 1133 | 1304 | 1590 | 500 | 1033 | 591 |
| % Elongation | 1514 | 1023 | 599 | 452 | 385 | 322 | 944 | 512 | 644 |
| Strain Recovery—% Difference After 100% Elongation—Hold for 1 Min. and Recover for 48 Hrs. | 2.5 | 3.5 | 8.5 | 11.9 | 16.2 | 23.9 | 3.4 | 13.8 | 2.7 |
| Strain Recovery—% Difference After 200% Elongation—Hold for 1 Min. and Recover for 48 Hrs. | 3.4 | 7.2 | 18.3 | 28.0 | 38.6 | 53.1 | 8.5 | 31.1 | 6.8 |
| Hardness — Shore D and Shore A (Use "A" When "D" <20 and Use "D" When "A: >90) | | | | | | | | | |
| "A" | 57 | 66 | 74 | 77 | 83 | 87 | 68 | 81 | 68 |
| "D" | 17 | 23 | 30 | 34 | 37 | 40 | 26 | 35 | 25 |
| Tear Strength lbs/in. | 125 | 208 | 309 | 341 | 358 | 344 | 221 | 331 | 232 |

| Ingredients/Blend# | 9 | 10 | 11 | B | C | D | E |
|---|---|---|---|---|---|---|---|
| CPE1 | 30 | | | 50 | 50 | 50 | 50 |
| CPE2 | | 30 | 20 | | | | |
| ABS1 | | 70 | 80 | | | | |
| ABS2 | 70 | | | | | | |
| ABS3 | | | | | | | |
| ABS4 | | | | 50 | | | |
| ABS5 | | | | | 50 | | |
| ABS6 | | | | | | 50 | |
| ABS7 | | | | | | | 50 |
| Tensile (PSI) | | | | | | | |
| Strenth @ Yield | 780 | 527 | 642 | 907 | 634 | 1260 | 1201 |

TABLE 1-continued

| CPE/ABS Blends | | | | | | | |
|---|---|---|---|---|---|---|---|
| Modulus @ 10% strain | 809 | 531 | 662 | 962 | 656 | 1314 | 1287 |
| Modulus @ 50% strain | 894 | 743 | 838 | 1175 | 792 | 1627 | 1513 |
| Modulus @ 100% strain | 971 | 860 | 960 | 1276 | 848 | 1839 | 1649 |
| Modulus @ 200% strain | 1162 | 1076 | 1219 | 1633 | 979 | 2184 | 1850 |
| Modulus @ 300% strain | — | 1349 | 1555 | 1939 | 1137 | — | — |
| % Elongation | 309 | 395 | 324 | 319 | 545 | 237 | 266 |
| Strain Recovery—% Difference After 100% Elongation—Hold for 1 Min. and Recover for 48 Hrs. | 24.3 | 18.3 | 25.1 | 54.1 | 27.4 | 55.2 | 57.4 |
| Strain Recovery—% Difference After 200% Elongation—Hold for 1 Min. and Recover for 48 Hrs. | 51.8 | 50.4 | 53.5 | 111 | 67.1 | 130 | 123 |
| Hardness — Shore D and Shore A (Use "A" When "D" <20 and Use "D" When "A: >90) | | | | | | | |
| "A" | 84 | 85 | 88 | 84 | 84 | 86 | 86 |
| "D" | 39 | 36 | 37 | 42 | 39 | 53 | 49 |
| Tear Strength lbs/in. | 351 | 369 | 370 | 511 | 475 | 662 | 595 |

We claim:

1. A thermoplastic elastomeric composition, comprising:
   (a) a chlorinated polyolefin present at a level of from 25 to 85 percent by weight based on the total weight of the composition, and
   (b) a graft copolymer having a rubber substrate present at a level of from 65 to 90 percent by weight based on the total weight of the graft copolymer;
   wherein the thermoplastic elastomeric composition has a Shore A hardness of less than 90, an elongation of at least 200% as measured by ASTM D638-89 at a crosshead speed of 20 inches/min., and a tensile strength as measured by ASTM D638-89 of at least 200 psi.

2. The composition of claim 1 wherein said chlorinated polyolefin is a chlorinated polyethylene.

3. The composition of claim 1 wherein said graft copolymer is vinyl aromatic-vinyl cyanide-diene rubber graft copolymer comprising a vinyl aromatic-vinyl cyanide superstrate and a diene rubber substrate.

4. The composition of claim 1 wherein said chlorinated polyolefin has a weight average molecular weight of between 100,000 and 300,000.

5. The composition of claim 4 wherein said composition has a Shore A hardness of less than 75.

6. The composition of claim 1 wherein said chlorinated polyethylene has a number average molecular weight of between 50,000 and 500,000.

7. The composition of claim 1 wherein said rubber substrate has a number average particle size diameter of between 0.05 and 1.2 microns.

8. The composition of claim 7 wherein said chlorinated polyethylene is present at a level of from 60 to 80 percent by weight based on the total weight of the composition.

9. The composition of claim 7 wherein said graft copolymer is present at a level of from 20 to 60 percent by weight based on the total weight of the composition.

10. The composition of claim 8 consisting essentially of said chlorinated polyethylene and said graft copolymer.

11. The composition of claim 1 wherein said composition comprises an additive selected from the group consisting of fillers, plasticizers, extruders, blowing agents, stabilizers and pigments.

12. The composition of claim 1, wherein the thermoplastic elastomeric composition has a Shore A hardness of less than 80, an elongation of at least 300% as measured by ASTM D638-89 at a crosshead speed of 20 inches/min., and a tensile strength as measured by ASTM D638-89 of at least 250 psi.

13. The composition of claim 12, wherein the thermoplastic elastomeric composition has an elongation of at least 400% as measured by ASTM D638-89 at a crosshead speed of 20 inches/min.

* * * * *